(12) United States Patent
Brown

(10) Patent No.: US 12,491,445 B2
(45) Date of Patent: Dec. 9, 2025

(54) VIRTUAL GAME ECONOMY INTEROPERABILITY

(71) Applicant: Delroy Brown, Indiantown, FL (US)

(72) Inventor: Delroy Brown, Indiantown, FL (US)

( * ) Notice: Subject to any disclaimer, the term of this patent is extended or adjusted under 35 U.S.C. 154(b) by 253 days.

(21) Appl. No.: 18/234,347

(22) Filed: Aug. 15, 2023

(65) Prior Publication Data

US 2024/0058705 A1    Feb. 22, 2024

Related U.S. Application Data

(60) Provisional application No. 63/398,340, filed on Aug. 16, 2022.

(51) Int. Cl.
| | |
|---|---|
| *A63F 13/792* | (2014.01) |
| *A63F 13/35* | (2014.01) |
| *G06Q 20/36* | (2012.01) |
| *G06Q 20/38* | (2012.01) |

(52) U.S. Cl.
CPC ............ *A63F 13/792* (2014.09); *A63F 13/35* (2014.09); *G06Q 20/36* (2013.01); *G06Q 20/381* (2013.01); *G06Q 20/389* (2013.01)

(58) Field of Classification Search
CPC ....... A63F 13/792; A63F 13/35; G06Q 20/36; G06Q 20/381; G06Q 20/389
See application file for complete search history.

(56) References Cited

U.S. PATENT DOCUMENTS

| | | | | |
|---|---|---|---|---|
| 2019/0122495 A1* | 4/2019 | Yi | ........................ | G07F 17/3209 |
| 2019/0180563 A1* | 6/2019 | Yi | ........................ | G07F 17/3225 |
| 2019/0188962 A1* | 6/2019 | Higgins | .............. | G07F 17/3251 |
| 2020/0020196 A1* | 1/2020 | Petersen | ............. | G07F 17/3218 |
| 2020/0327775 A1* | 10/2020 | Larimer | .................. | G06F 21/78 |
| 2020/0394872 A1* | 12/2020 | Springer | ............. | G07F 17/3239 |
| 2021/0086084 A1* | 3/2021 | Yi | ........................ | G06Q 20/065 |
| 2021/0287118 A1* | 9/2021 | Pierce | ...................... | G06N 3/08 |
| 2022/0138845 A1* | 5/2022 | Shepherd | ............. | G06Q 20/102 705/38 |
| 2023/0128945 A1* | 4/2023 | Khan | ................... | G06Q 20/381 705/14.39 |
| 2024/0428306 A1* | 12/2024 | Sliwka | .................. | H04L 9/0891 |

* cited by examiner

*Primary Examiner* — Dmitry Suhol
*Assistant Examiner* — Ankit Doshi
(74) *Attorney, Agent, or Firm* — David Olsen (57) ABSTRACT

A method of transferring assets and resources between virtual game economies that where machine learning logic manages the resource exchange rates and the resources with the virtual game economies to provide a stable relationship between the virtual economies. A blockchain is used to track the transactions into, out of, and between the virtual economies.

20 Claims, 4 Drawing Sheets

*FIG. 1*

205: Accessing a first secure container associated with a user identifier and a first virtual game.

210: Withdrawing a first virtual game currency amount from the first secure container.

215: Sending the first virtual game currency amount to an exchange server.

220: Determining a number of IV tokens for the first game virtual currency amount, based on machine learning logic.

225: Updating blockchain with IV token amount, conversion rate, and user identifier.

230: At a subsequent time, receiving a request for transferring IV tokens amount associated with the user identifier to a second game environment.

235: Updating the blockchain with a withdrawal IV token amount.

240: Determining a second conversion rate between a IV token using machine learning.

245: Convert the withdrawal IV token amount to a second virtual currency amount based on the second game virtual currency conversion rate.

250: Accessing a second secure container associated with the second virtual game and the user identifier.

250: Adding the second virtual currency amount to the second secure container.

VIRTUAL GAME ECONOMY INTEROPERABILITY

CROSS-REFERENCE TO RELATED APPLICATIONS

This application claims the benefit and priority of the U.S. Provisional Application Ser. No. 63/398,340, filed on Aug. 16, 2022, entitled "VIRTUAL ECONOMY INTEROPERABILITY" all of which is incorporated by reference herein in its entirety, including all references and appendices, for all purposes.

FIELD OF THE INVENTION

This patent is related to the technology field and concerns blockchain and AI (Artificial Intelligence) machine learning technology to provide virtual resource exchangeability between virtual game environments. More particularly, but not by way of limitation, to provide systems and methods utilizing blockchain technology, game engine technologies, and machine learning to virtual environments to communicate seamlessly with other digital virtual environments for facilitating the transfer of value between the virtual game environments.

BACKGROUND OF THE INVENTION

A virtual economy, sometimes referred to as a synthetic economy, is an emergent economy existing in a virtual world, usually exchanging virtual goods in the context of a video game or online game, particularly in massively multiplayer online games (MMOs) and more recently the Metaverse. People enter these virtual economies for recreation and entertainment rather than necessity, which means that virtual economies lack the aspects of a real economy that are not considered to be "fun." For instance, avatars in a virtual economy often do not need to buy food in order to survive and usually do not have any biological needs at all. However, some people do interact with virtual economies for "real" economic benefit. Despite primarily dealing with in-game currencies, this term also encompasses the selling of virtual currency for real money in what is sometimes called "open centralized marketplaces."

The term "open centralized marketplaces" in of itself is a conflict in terms. From the start, it suggests that it is open, yet it is not open. Presently this causes a host of issues today when it comes to gamers, game developers, and game publishers. Gamers are not able to transfer the value they enter into a game or Metaverse's virtual currency. If a user wishes to enter a new world, their economic value gained in the first game is lost or locked in the first game's virtual currency because it uses the "open centralized marketplaces" models or a variation of it. Therefore, what is needed are systems and methods to overcome the above-mentioned disadvantages and enable the transfer and exchange of virtual currency between different economic environments.

SUMMARY OF THE INVENTION

In one aspect of the invention is a method of exchanging virtual resources between virtual game economies comprising. The method is comprised of accessing a first secure container associated with a user identifier and a first virtual game. First, a first virtual game resource amount is withdrawn from the first secure container. This first virtual game resource amount is sent to an exchange server. The exchange server determines a number of IV tokens or coins for the first game virtual currency amount, wherein machine learning logic determines a conversion rate between the first game virtual currency amount and the IV tokens. The IV tokens or coin amount and the conversion rate, along with a user identifier, are stored in a blockchain.

Subsequently, a request is received for transferring a IV tokens amount associated with the user identifier to a second game environment for the same user. The blockchain is updated with a withdrawal of an IV token or coin amount based on the requested amount and user identifier. The system determines a second conversion rate between the IV token and the second game resource or second game virtual currency. The conversion rates are determined by machine learning logic that operates with the objective of keeping stability between the virtual game environments.

Next, the IV tokens or coins are converted into a second virtual currency or resource amount based on the second game virtual currency conversion rate. Next, a second secure container associated with the second virtual game and the user identifier is accessed. The second secure container can be a second crypto-wallet or a liquidity pool. The exchange of resources or virtual money between virtual games is completed by adding the second virtual currency amount to the second secure container.

DETAILED DESCRIPTION

The following detailed description includes references to the accompanying drawings, which are a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, other embodiments can be utilized, or structural, functional, logical, and electrical changes can be made without departing from the scope of what is claimed. The following detailed description is, therefore, not to be taken in a limiting sense, and the scope is defined by the appended claims and their equivalents.

Embodiments of the present invention aim to solve the problem of virtual economy interoperability by utilizing Artificial Intelligence and machine learning. Using blockchain and game engine technologies, developers and publishers can easily create interoperability between the economies of their games and those of other developers or publishers. This described invention embodiment enables the efficient exchange of value between the virtual economies, with the added benefit of AI and machine learning to optimize and enhance the interoperability process and create a stable virtual currency environment.

The system providing currency interoperability between game environments can include a technology termed "Dynamic Lock" designed to maintain balance and stability in virtual resources and money in the virtual game economies. Dynamic Lock refers to a mechanism that regulates the liquidity of in-game resources in relation to the virtual token also referred to as an IV token or coin. The IV token is a token having a value in relation to virtual environment resources, including virtual game resources. The term IV token or token can be used interchangeably with "IV coin" or "coin" When a value is part of a public blockchain, it is commonly referred to as a Token. When the blockchain is self managed, it is referred to as a coin. The IV token can be managed by the Exchange Server and transactions involving the IV tokens can be tracked and managed on a blockchain. It safeguards the value of the in-game resources by ensuring that any sudden increase or decrease in the market value of one game currency does not drastically affect the value of other game resources or money.

The Dynamic Lock system utilizes advanced algorithms and/or machine learning logic to continuously monitor the state of the virtual economy and automatically adjust the liquidity of in-game resources and monies as required. The term virtual economy means the collection of virtual game economies by which virtual assets and the games' virtual money can be exchanged with another virtual game. By maintaining a careful balance, the Dynamic Lock mechanism ensures the sustainability of the virtual economy while offering participants an equitable and steady trading environment.

The Dynamic Lock system provides a dynamic and automated mechanism designed to maintain the balance and health of the virtual economy by preventing instabilities in the availability and exchange of resources. The Dynamic Lock system can be a component of the Exchange Server. Key to the system is the game servers are configured with an interface that enables the Dynamic Lock system on the exchange server to monitor and access user behavior, virtual resources and manage virtual currencies within a game. This interface can be a plugin with an API (Application Program Interface). Further, the user programs associated with the game can include an API for the Dynamic Lock system to access resources and virtual funds of a user's system. The Dynamic Lock system includes the following functions:

Data Collection: The system starts by continuously collecting data from various in-game activities. This includes transactions such as average purchasing and selling virtual game assets, selling price for virtual resources, virtual resource availability, exchange rates for game virtual resources and IV tokens, player behaviors such as average assets owned by a player, how often a player plays, the length of time of gameplay, number of users registered users for the game, statistics on how many users are using the game at the same time, aggregated resources creation and consumption, the value of game resources in terms of the IV tokens, the value of the game users crypto wallets or user assets in the liquidity pool, and other in-game economic activities.

State Monitoring: The exchange server communicates with the game servers and can communicate with the user's computers to assess the current state of the plurality of virtual game economies. The exchange server gathers information regarding game resources, like availability of in-game virtual resources, transaction volume, player engagement levels such as length of time play, number of players using a game, and any other relevant values or aspects of the game environments.

Machine Learning Analysis: The machine learning component comes into play by training with historical data alongside the current data. It's trained to recognize patterns and trends that might indicate potential future imbalances in the economy. For instance, if there's a sudden spike in a particular resource, the system might predict a potential future scarcity and take measures to prevent that. For example, it may adjust the conversion rate for any resource in the virtual game environment with the IV tokens. This affects the exchange rate between game resources.

Liquidity Adjustment: Based on real-time monitoring of the game resources, assets, virtual game money, and machine learning training, the machine learning component of the exchange system can provide stabilization feedback by adjusting the liquidity of in-game resources. This means it can either release more of a particular resource into the game (if there's a forecasted shortage) or restrict its supply (if there's a predicted oversupply). The goal is to prevent drastic market fluctuations and ensure a steady and balanced in-game economy. Further, the machine learning component can adjust the exchange rate between the IV tokens and each game's resources.

Continuous Feedback Loop: What sets the Dynamic Lock system apart is its ability of the machine learning component to learn and adapt to changes in the game's economic environment to provide stability of the game environments. As the machine learning component system makes adjustments to the availability of resources and exchange rates between game resources and the IV tokens, it continually receives feedback on the outcomes of those adjustments. This feedback is used to refine and improve its predictive models, ensuring it becomes more accurate and efficient over time.

The Dynamic Lock system serves as an automated overseer of the virtual economy, ensuring stability and balance by leveraging the power of data analytics and machine learning. The Dynamic Lock is implemented in a way that it communicates with the overarching system and the individual game servers. It continuously assesses data regarding user behavior, market trends, transaction volumes, and in-game events. The algorithm determines the appropriate adjustments to game resources and exchange rates between the game resources and the IV tokens to be made in the liquidity of in-game resources in relation to the IV token, thereby maintaining the value and balance of the virtual economy.

The Dynamic Lock, when integrated with the overarching Invo system and individual game servers, could make several adjustments based on the continuous assessment of data. Here's a potential breakdown of the adjustments the Dynamic Lock might make:

Resource Allocation: The system might increase or decrease the availability of one or more in-game resources. If there's a surge in demand for a specific item or resource, Dynamic Lock might increase its supply to stabilize prices and ensure player accessibility to a resource. Conversely, if there's an oversupply or diminished demand, it might reduce the resource's generation rate or availability.

Transaction Limitations: If there's suspicious behavior detected, like potential price manipulation or resource hoarding, the system can temporarily limit the number of transactions a player can make. This would be a preventive measure to ensure the in-game economy remains stable.

Pricing Modifications: In games where there's a standard in-game store with fixed prices, the Dynamic Lock system can, in some embodiments, adjust item prices based on demand and availability, ensuring a balanced and dynamic market.

In-game Event Triggers: Sometimes, the health of a virtual economy can be maintained by initiating certain in-game events. If resources are becoming too scarce, an event that allows players to "hunt" or "mine" those resources might be triggered by the Dynamic lock system. Conversely, if there's an overabundance, an event that encourages the use or consumption of those resources might be launched by the Dynamic Lock system. This is an alternative to just directly modifying the resources.

Adjustment of Exchange Rates: If the game allows for the exchange of one in-game currency or resource for another, the Dynamic Lock system can modify these exchange rates to reflect the current value and demand of each.

Liquidity Pools Adjustments: In scenarios where there are liquidity pools, the Dynamic Lock might adjust the ratios of assets within a pool, ensuring that swaps and trades remain fair and reflective of the current market conditions.

Feedback Mechanisms: The Dynamic Lock can also implement mechanisms to gather direct feedback from players, allowing them to voice concerns or observations about the in-game economy. This feedback can be integrated into the system's decision-making processes.

Rate of Resource Regeneration: For games that have regenerative resources (like energy or stamina), the Dynamic Lock can adjust the rate at which these resources regenerate based on overall player activity and game economy needs.

The system and method can employ a blockchain to ensure that the one or more processes for changing resource ownership are transparent and secure. All transactions and adjustments made by the Dynamic Lock system are recorded in a decentralized or centralized ledger of a blockchain, allowing all participants to monitor and validate the operations.

The system can provide the capability to purchase IV tokens directly, either with fiat currency or with another cryptocurrency. The exact distribution mechanism of the IV tokens to acquire system resources may vary depending on the design of each individual virtual economy, but all distributions would be handled securely through a dynamic valuation system.

The system can incorporate a variety of security measures to protect virtual assets and transactions. These may include strong encryption algorithms to secure data in transit and at rest, fraud detection systems to identify and prevent fraudulent transactions, and secure identity verification methods to protect user accounts. For example, two device authentications, such as a computer and phone with an access code, could be useful. Additionally, all IV token transactions are recorded on a secure, immutable ledger for being auditable and transparency.

To manage volatility in the economies and the potential volatiles of the virtual currencies and resources, the system uses advanced predictive models and machine learning algorithms. These tools analyze data from within each virtual economy as well as broader market trends and can adjust the value of IV tokens/IV tokens dynamically in response to changing conditions. Further, resources can be modified by the Dynamic Lock system to further provide stability to the virtual game economies. The monitoring can include the value of each game environment, the flow of value or currency into each game economy, the flow rate of game currencies between game economies, the number of users in each game economy, and the rate of change of the number of users in a game economy. This will help to prevent rapid inflation or deflation and maintain stability in the IV token and, thus the stability in the overall virtual economy.

The system will be designed with regulatory compliance in mind. It includes features to ensure compliance with relevant financial regulations, such as anti-money laundering (AML) and Know Your Customer (KYC) requirements.

The dynamic valuation system can be integrated with existing virtual economies or game systems. Developers and publishers can use provided APIs and other interfaces to connect their games to the system, allowing them to take advantage of its features without needing to significantly modify their existing codebase.

The described embodiment of the system includes mechanisms to adjust the value of IV/virtual tokens and resources or intervene in the virtual economies in response to certain situations. For example, if a virtual economy experiences a sudden influx of new players or a significant change in player behavior, the system could adjust the value of IV/virtual tokens or modify other parameters such as exchange rates to maintain stability.

The system can achieve decentralization through its distributed ledger and consensus algorithm. All transactions are recorded on a decentralized ledger, and consensus is achieved through a robust protocol that protects against attacks and ensures that all nodes agree on the state of the ledger. This protocol is commonly known as blockchain technology. This not only provides security and transparency but also ensures that no single entity has control over the system.

The Dynamic Lock system, also referred to as the dynamic valuation system for each virtual economy, will use artificial intelligence and machine learning to analyze data and make predictions in real-time. The system will be trained on factors such as the number of users using a gaming system and the amount of time a user is using a gaming system, transaction volume, and market trends, among others to determine the fair value of each virtual economy sending and removing liquidity from each virtual economy in its index as needed.

The valuation system can use a system other than will not use a market capitalization method and instead use a predictive modeling approach to calculate the virtual economy's value. The system will continuously monitor and analyze user behavior, in-game transactions, and other relevant data to make predictions about the virtual economy's present and future value.

To ensure the accuracy of the valuation, the system will also take into account the entrance of new virtual economies into the index. It will adjust the valuation formula dynamically to account for any changes that could affect the value of each virtual economy.

Preferably this new system will eliminate the need for an index divisor, as the predictive modeling approach will dynamically adjust all virtual economy's value in the index based on real-time data analysis. This will ensure that the value of the virtual economies in the index are always reflective of its true market value and not influenced by non-economic factors.

Overall, the dynamic valuation system will provide a more accurate and reliable method for valuing virtual economies, enabling users and developers or publishers to make more informed decisions about their virtual economies.

Preferably developers or publishers will be able to set the value of their in-game resources as it relates to the IV token when using our technology.

Preferably developers or publishers will purchase some amount of IV token to front-load their virtual economy. 50% of these IV tokens will be placed in wallets that serve as a store of value for their virtual economy.

Preferably the other 50% can be staked in the Invo DEX in order to provide system-wide liquidity and passive earning income for the developers or publishers.

Preferably game developers or game publishers cannot sell any of the 50% of the token within the frozen wallet. The system can create the frozen wallet and add the requisite balance for the developer or publisher. The balance in the frozen wallet will serve as a liquidity balance for that developer or publisher's virtual economy.

System Overview

Figure 1:
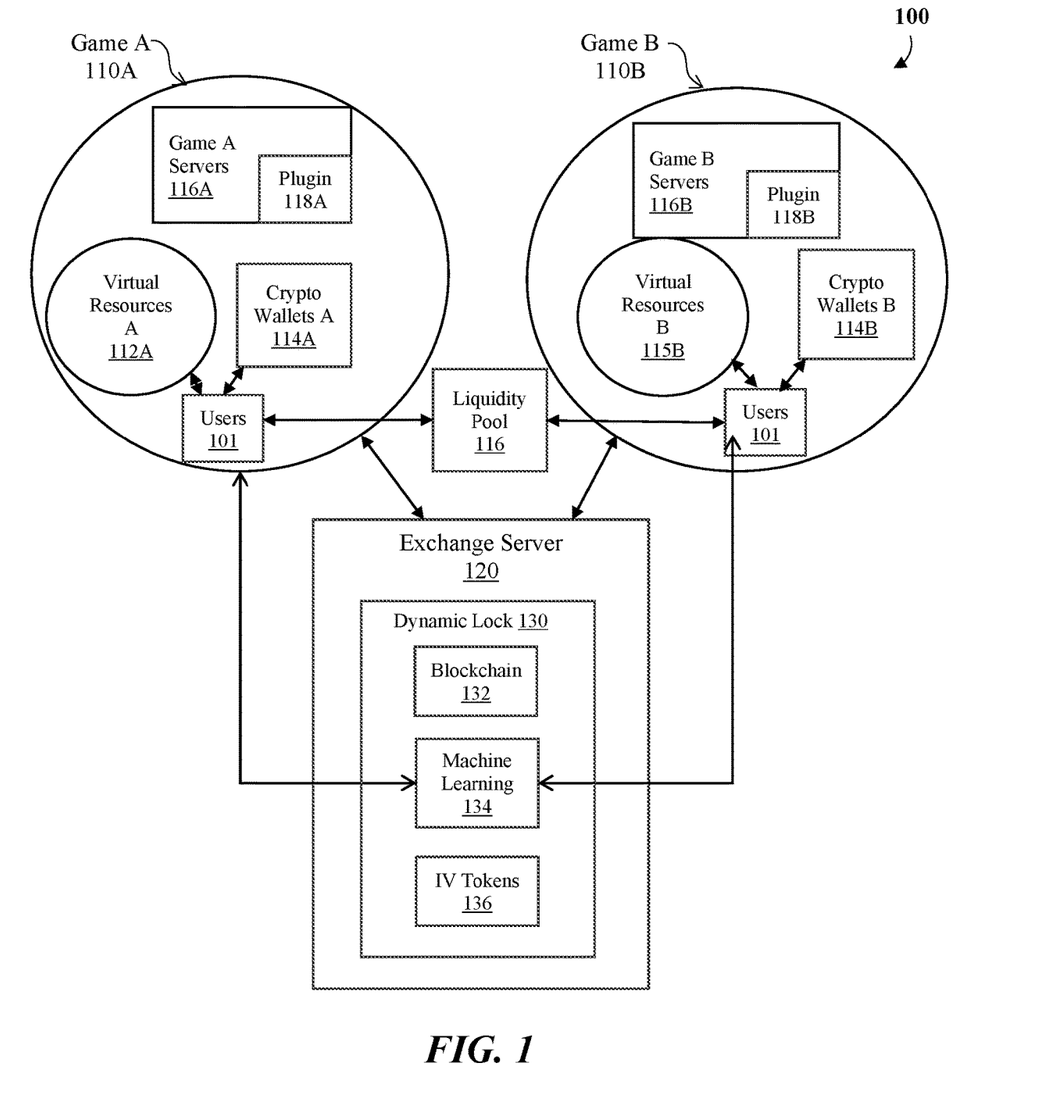
FIG. 1—A block diagram of the environment in which virtual gaming operates.

Referring to FIG. 1, a system and environment 100 in which virtual game resources are exchanged from one virtual gaming environment 110A to another virtual gaming environment 110B using an Exchange Server 120. Further, this system 100 includes the components to manage the stability of the virtual game environments 110A, 110B. While only two environments 110A, 110B are shown, there can be many more virtual game environments. Further, while the Exchange Server 120 is shown as a single server, this element 120 can be implemented utilizing multiple servers in distributed locations.

The game environment 110A, 110B can include Virtual Resources which can include, but are not limited to assets, virtual, and virtual resources 112A, 112B associated with virtual game environments 110A, 110B. The virtual assets 112A, 112B can include a game currency or other virtual items for which a user pays for or sells within a virtual Game environments 110A and 110B.

Users 101 operate in one or more virtual game environments 101A and 101B. A user can have crypt-wallet 114A for each of the virtual game environments or can be associated with a liquidity pool holding virtual currency for multiple game environments 110A, 110B. There can be a crypto wallet for each of the users 101. The crypto wallet holds virtual game currency, assets, or resources associated with a user. Note, that resources can be associated with a game environment but not associated with a user 101. Alternatively, a user 101 can access a liquidity pool 116 to buy assets in a game environment 110A, 110B or store the results of a sale.

The game environments 110A and 110B include the game servers 116A, 116B which includes all the components and software for executing the game and communicating with the users 110 and the Exchange Server 120. Additionally, the game servers 116A, 116B can include a Plugin 118A which enables communication with the Dynamic Lock component 130 of the Exchange Server 120 to access and adjust the resources on the Game Servers 116A, 116B.

When one of the users 101 wants to transfer virtual assets from one game environment 101A to another game environment 110B, a request is made to an Exchange Server 120.

Figure 2:
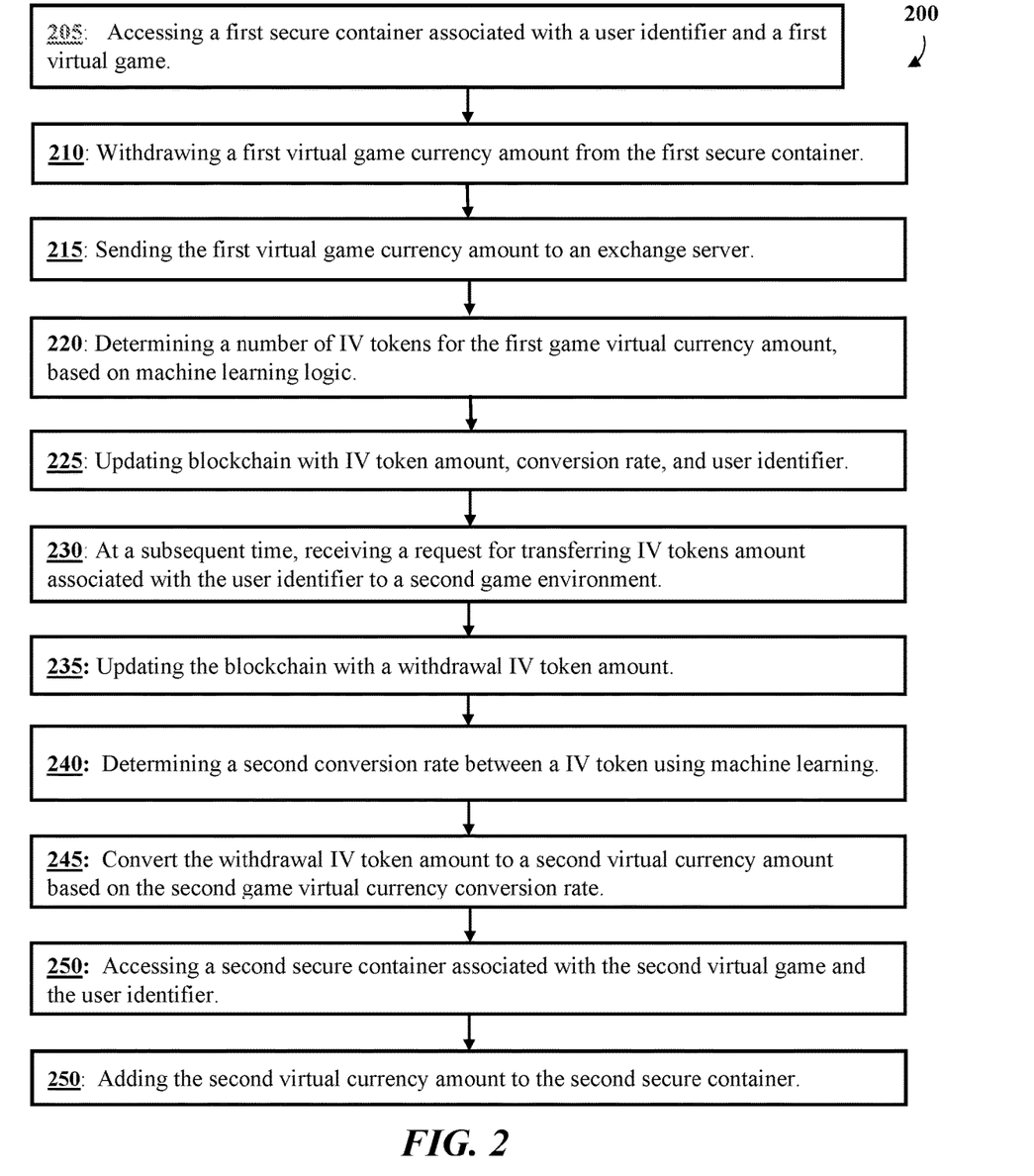
FIG. 2—A flow diagram of transferring virtual currencies between a first gaming environment and a second gaming environment.

Referring to FIG. 2, is a flowchart 200 for exchanging virtual asset between virtual game economies. Virtual currency is use to purchase virtual items or virtual assets within a virtual game or other virtual world. For example, the virtual asset could be a shield, sword, or land in a virtual game. However, the same virtual currency often cannot be used in a different game to purchase other virtual items or assets.

In step 205, a secure container is accessed based on a user identifier for a specific virtual game. The secure container can be a digital wallet or a pool. A "crypto wallet" is a digital wallet that allows users to securely store, send, and receive digital currencies like Bitcoin, Ethereum, and others. This wallet can be a software application (on a desktop, mobile, or web-based) or a hardware device, each containing a pair of cryptographic keys. The public-key is used to receive funds, and the private key, kept secret, is used to sign transactions and access the funds.

On the other hand, "liquidity pools" are a type of decentralized market-place where users can lend or borrow different cryptocurrencies. Liquidity pools are a core feature of many decentralized finance (DeFi) platforms. In these platforms, liquidity providers deposit their tokens into a liquidity pool. This pool powers a marketplace where users can lend, borrow, or exchange tokens. The use of these pools in DeFi platforms promotes efficient trading and better price stability. The providers often get a return on their investment from trading fees based on the percentage of the liquidity pool that they provide.

Accessing the first secure container can be performed using secure encrypted communication channels.

In step 210, a specified amount of virtual game currency associated with the game is withdrawn from the first secure container. The first secure container can be on a user's computer or stored on a remote server.

In step 215, the first virtual game currency amount is sent to an exchange server. The exchange server is a repository of user currency and transaction history. The exchange server holds the IV tokens that are managed for the stability of the overall virtual environment for all the associated virtual games.

In step 220, the first virtual game currency amount is converted to IV tokens. The exchange rate is determined to maintain the stability of the overall token environment of the system. The exchange rate is determined by machine learning logic that can be trained on variables such as the size of the different virtual games or virtual economies.

In step 225, the IV tokens from the exchange are stored within a blockchain along with a user identifier and the exchange rate used in the conversion of tokens.

In step 230, a request, at a subsequent time, is made to transfer a IV token amount from the blockchain to a second game environment. The request includes the user identifier and can include the exchange rate used between the first virtual game currency and the IV tokens at the time that the transaction into IV tokens was made.

In step 235, the blockchain is updated to reflect that deduction of the IV token amount from the user identifier account.

In step 240, the withdrawn IV tokens are converted into a second virtual game currency at a second conversion rate.

In step 245, a second conversion rate for the second virtual game is determined by machine learning logic. This conversion rate is determined at the time of the conversion to help provide stability of the IV token environment.

In step 250, the second virtual currency amount is added to the secure container.

Dynamic Flow Resource Control

Figure 3:
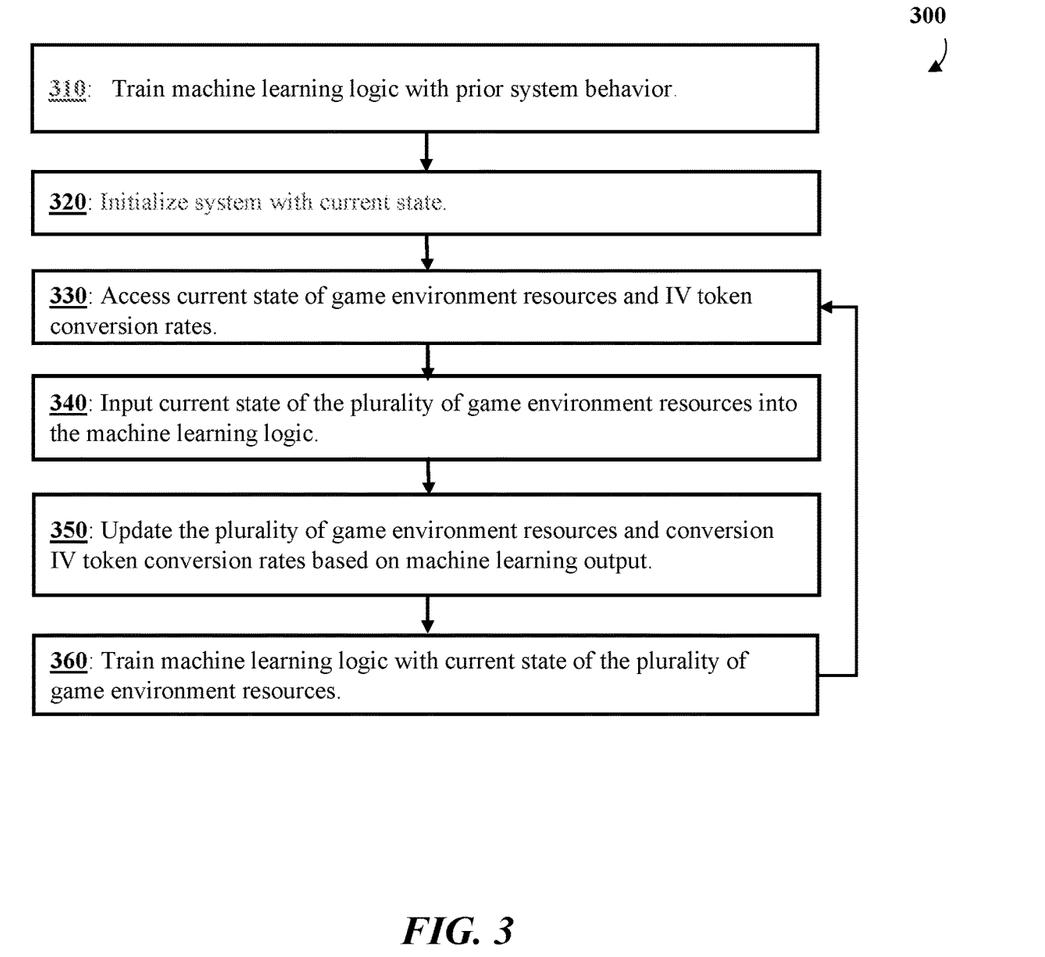
FIG. 3—A flow diagram of machine learning adjusting resources of a gaming environment to maintain system stability.

Referring to FIG. 3, a flowchart 300 for controlling resources is shown and described. The control of resources can be provided by machine learning logic and be trained to reduce the change in the value of the different game economies. This can include reducing the rate of change between the economies.

In step 310, the machine learning logic is trained to promote one or more system behaviors. This can include the stability of one or more of the exchange rates between game environments, the stability of the value of a game environment, and the stability of one or more resources in the game environment.

In step 320, the Dynamic Lock and machine learning logic is initialized with the current state of the game environments and the trained machine learning logic state.

In step 330, the current state of the game environment resources and IV token conversion rates are accessed. This can occur after the system has run for a period of time which can range from minutes to several hours.

In step 340, the current state of the system is input into the machine learning logic for the machine learning logic to generate adjustments to one or more of the exchange rate for game resources and IV tokens. Additionally, the machine learning logic can determine changes to the availability of game resources or launching game quests that can increase or decrease the amount of game resources.

In step 350, one or more resources are updated according to the adjustment generated by the machine learning logic.

In step 360, the machine learning logic uses the current state of the game environment resources, IV token exchange rate, and conversion rates to update the machine learning logic. The method then goes to step 330 to repeat the steps 330-360.

Computer System

Figure 4:
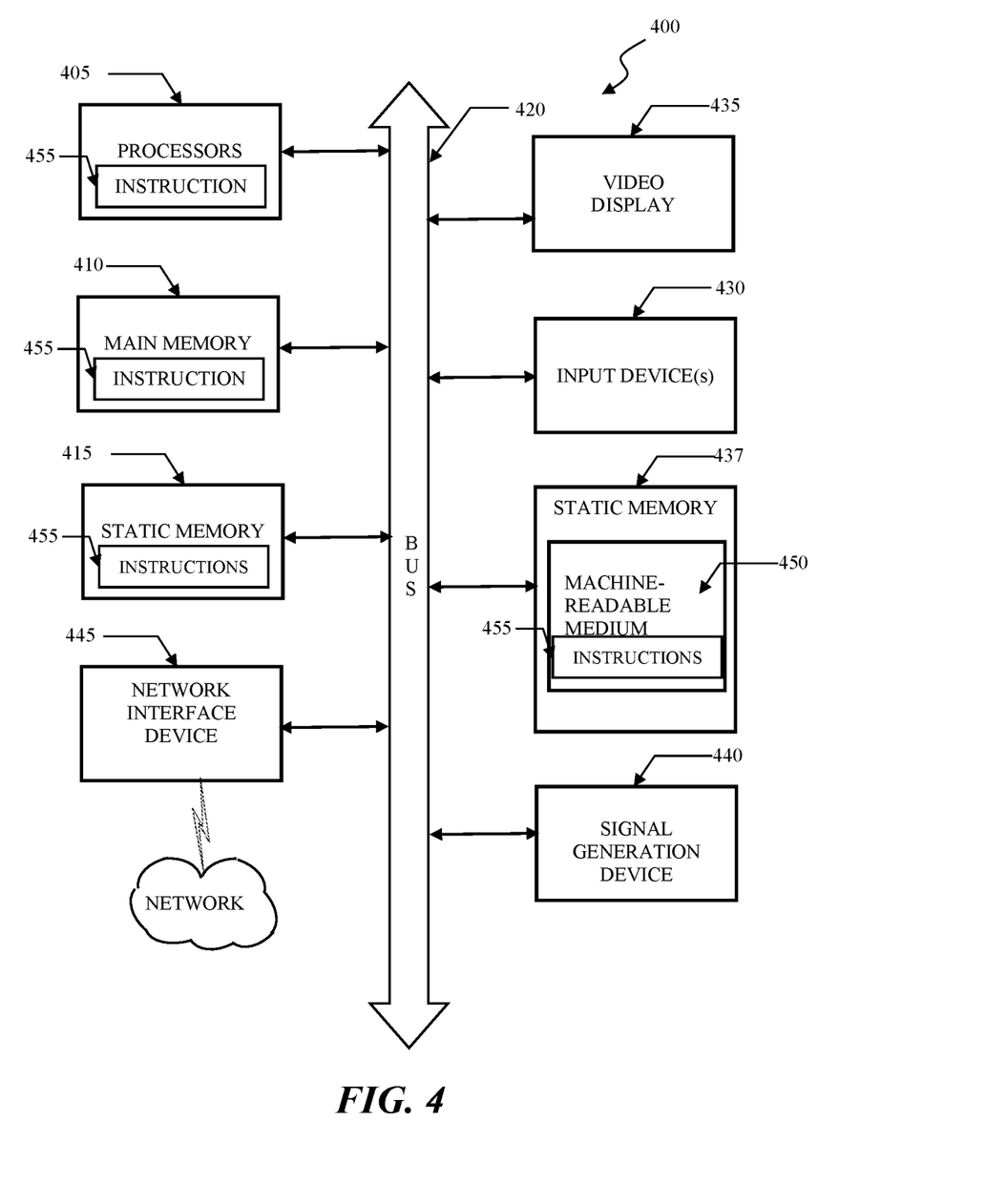
FIG. 4—A simplified block diagram of a computing system in accordance with some embodiments.

FIG. 4 is a diagrammatic representation of an example machine in the form of a computer system 400, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment or as a peer machine in a peer-to-peer (or distributed) network environment. The machine may be, for example, a base station, a personal computer (PC), a tablet PC, a set-top box (STB), a personal digital assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor or multiple processors 705 (e.g., a central processing unit (CPU), a graphics processing unit (GPU), Digital Signal Processor, Neural Processor Unit (NPU) or any combination thereof), and a main memory 410 and static memory 415, which communicate with each other via a bus 420. The computer system 400 may further include a video display 435 (e.g., a liquid crystal display (LCD)). The computer system 400 may also include an alpha-numeric input device(s) 430 (e.g., a keyboard), a cursor control device (e.g., a mouse), a voice recognition or biometric verification unit (not shown), a drive unit 437 (also referred to as disk drive unit), a signal generation device 740 (e.g., a speaker), and a network interface device 445. The computer system 400 may further include a data encryption module (not shown) to encrypt data.

The drive unit 437 includes a computer or machine-readable medium 450 on which is stored one or more sets of instructions and data structures (e.g., instructions 755) embodying or utilizing any one or more of the methodologies or functions described herein. The instructions 455 may also reside, completely or at least partially, within the main memory 410 and/or within static memory 415 and/or within the processors 405 during execution thereof by the computer system 400. The main memory 410, static memory 415, and the processors 405 may also constitute machine-readable media.

The instructions 455 may further be transmitted or received over a network via the network interface device 445 utilizing any one of a number of well-known transfer protocols (e.g., Hyper Text Transfer Protocol (HTTP)). While the machine-readable medium 450 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read-only memory (ROM), and the like. The example embodiments described herein may be implemented in an operating environment comprising software installed on a computer, in hardware, or in a combination of software and hardware.

Not all components of the computer system 400 are required and thus portions of the computer system 400 can be removed if not needed, such as Input/Output (I/O) devices (e.g., input device(s) 430). One skilled in the art will recognize that the Internet service may be configured to provide Internet access to one or more computing devices that are coupled to the Internet service and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams can be implemented by computer program instructions. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture, including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present technology. In this regard, each block in the flowchart or block diagrams may represent a module, section, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or combinations of special purpose hardware and computer instructions.

In the following description, for purposes of explanation and not limitation, specific details are set forth, such as particular embodiments, procedures, techniques, etc., in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms, and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted that the terms "coupled," "connected," "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only and are not drawn to scale.

If any disclosures are incorporated herein by reference and such incorporated disclosures conflict in part and/or in whole with the present disclosure, then to the extent of conflict, and/or broader disclosure, and/or a broader definition of terms, the present disclosure controls. If such incorporated disclosures conflict in part and/or in whole with one another, then to the extent of conflict, the later-dated disclosure controls.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed:

1. A computer implemented method of exchanging virtual resources between virtual game economies comprising:
   initializing machine learning logic trained to generate stable conversion rates between virtual games and IV tokens including a first virtual game conversion rate and a second virtual game conversion rate;
   receiving a request to exchange a first virtual currency amount from a first virtual game to a second virtual game;
   accessing a first secure container associated with a user identifier and a first virtual game;
   withdrawing the first game virtual currency amount from the first secure container;
   sending the first game virtual currency amount to an exchange server;
   determining a number of IV tokens for the first game virtual currency amount, wherein the machine learning logic determines a first virtual game conversion rate between the first game virtual currency amount and the IV tokens;
   storing in a blockchain the IV token amount, the conversion rate, and the user identifier;
   at a subsequent time, receiving a request for transferring the IV tokens amount associated with the user identifier to a second game environment;
   updating the blockchain with a withdrawal of the IV tokens amount based on the user identifier;
   determining a second virtual game conversion rate between IV token, wherein the machine learning is used to determine the second virtual game conversion rate between a second game virtual currency and the IV tokens;
   convert the withdrawal token amount to a second virtual currency amount based on the second virtual game conversion rate;
   accessing a second secure container associated with the second virtual game and the user identifier;
   adding the second virtual currency amount to the second secure container; and
   retraining continuously the machine learning logic with the first game virtual currency amount and the second game virtual currency amount.

2. The method of claim 1, wherein the blockchain includes an executable contract.

3. The method of claim 1, wherein the machine learning logic determines the conversion rate between the first game virtual currency and the IV tokens and the conversion rate between the second game virtual currency, wherein the machine learning logic is trained by monitoring a first value of the first game environment and a second value of the second game, wherein the machine learning logic minimizes the rate of change in the conversion rate between the first game virtual currency and the IV token and the rate of change between the second game virtual between and the IV token.

4. The method of claim 3, wherein the machine learning logic is further trained with the flow of value into the first value of the first game economy and the flow of value into the second value of the second game economy.

5. The method of claim 4, wherein the machine learning logic is further trained with the flow rate of value from the first value of the first game economy into the value of the second value of the second game environment.

6. The method of claim 5, wherein the machine learning logic is further trained with the rate of change of a number of users between the first game economy and the second game economy.

7. The method of claim 1, wherein the secure container is one of a crypto wallet or liquidity pool.

8. A system for exchanging virtual currency between virtual game economies comprising:
   one or more exchange servers configured to:
      initialize machine learning logic trained to generate stable conversion rates between virtual games and IV tokens including exchanges between a first virtual game conversion rate and a second virtual game conversion rate;
      receive a request to exchange a first virtual currency amount from a first virtual game to a second virtual game;
      accessing from a network coupled device a first secure container associated with a user identifier and a first virtual game;
      withdrawing a first game virtual currency amount from the first secure container;
      sending the first game virtual currency amount to an exchange server;
      determining a number of IV tokens for the first game virtual currency amount, wherein the machine learning logic determines a first virtual game conversion rate between the first game virtual currency amount and the IV tokens;
      storing in a blockchain the IV token amount, the conversion rate, and the user identifier;
      at a subsequent time, receiving a request for transferring the IV tokens amount associated with the user identifier to a second game environment;
      updating the blockchain with a withdrawal of the IV token amount based on the user identifier;
      determining a second virtual game conversion rate between IV token, wherein the machine learning is used to determine the second virtual game conversion rate between a second game virtual currency and the IV tokens;
      convert the withdrawal token amount to a second virtual currency amount based on the second virtual game conversion rate;
      accessing a second secure container associated with the second virtual game and the user identifier;
      adding the second virtual currency amount to the second secure container; and
      retraining continuously the machine learning logic with the first game virtual currency amount and the second game virtual currency amount.

9. The system of claim 8, wherein the blockchain includes an executable contract.

10. The system of claim 8, wherein the machine learning logic determines the conversion rate between the first game virtual currency and the IV tokens and the conversion rate between the second game virtual currency, wherein the machine learning logic is trained by monitoring a first value of the first game environment and a second value of the second game, wherein the machine learning logic minimizes the rate of change in the conversion rate between the first game virtual currency and the IV token and the rate of change between the second game virtual between and the IV token.

11. The system of claim 8, wherein the machine learning logic is further trained with the flow of value into the first value of the first game economy and the flow of value into the second value of the second game economy.

12. The system of claim 11, wherein the machine learning logic is further trained with the flow rate of value from the first value of the first game economy into the value of the second value of the second game environment.

13. The system of claim 12, wherein the machine learning logic is further trained with the rate of change of a number of users between the first game economy and the second game economy.

14. The system of claim 8, wherein the secure container is one of a crypto wallet or liquidity pool.

15. A non-transitory computer-readable storage medium having embodied thereon instructions, which when executed by a processor, perform steps of a method exchanging virtual currency between virtual game economies, the method comprising:
   initializing machine learning logic trained to generate stable conversion rates between virtual games and IV tokens including exchanges between a first virtual game conversion rate and a second virtual game conversion rate;
   receiving a request to exchange a first virtual currency amount from a first virtual game to a second virtual game;
   accessing a first secure container associated with a user identifier and a first virtual game;
   withdrawing a first game virtual currency amount from the first secure container;
   sending the first game virtual currency amount to an exchange server;
   determining a number of IV tokens for the first game virtual currency amount, wherein machine learning logic determines a conversion rate between the first game virtual currency amount and the IV tokens;
   storing in a blockchain the IV token amount, the conversion rate, and the user identifier;
   at a subsequent time, receiving a request for transferring of the IV tokens amount associated with the user identifier to a second game environment;
   updating the blockchain with a withdrawal of the IV tokens amount based on the user identifier;
   determining a second virtual game conversion rate between IV token, wherein machine learning is used to determine the second virtual game conversion rate between a second game virtual currency and the IV tokens;
   convert the withdrawal token amount to a second virtual currency amount based on the second virtual game conversion rate;
   accessing a second secure container associated with the second virtual game and the user identifier;
   adding the second virtual currency amount to the second secure container; and
   retraining continuously the machine learning logic with the first game virtual currency amount and the second game virtual currency amount.

16. The non-transitory computer-readable storage medium of claim 15, wherein the blockchain includes an executable contract.

17. The non-transitory computer-readable storage medium of claim 15, wherein the machine learning logic determines the conversion rate between the first game virtual currency and the IV tokens and the conversion rate between the second game virtual currency, wherein the machine learning logic is trained by monitoring a first value of the first game environment and a second value of the second game, wherein the machine learning logic minimizes the rate of change in the conversion rate between the first game virtual currency and the IV token and the rate of change between the second game virtual between and the IV token.

18. The non-transitory computer-readable storage medium of claim 17, wherein the machine learning logic is further trained with the flow of value into the first value of the first game economy and the flow of value into the second value of the second game economy.

19. The non-transitory computer-readable storage medium of claim 18, wherein the machine learning logic is further trained with the flow rate of value from the first value of the first game economy into the value of the second value of the second game environment.

20. The non-transitory computer-readable storage medium of claim 19, wherein the machine learning logic is further trained with the rate of change of a number of users between the first game economy and the second game economy.

* * * * *